United States Patent Office

3,795,630
Patented Mar. 5, 1974

3,795,630
CHEMICALLY STABLE, NON-SEPARATING ORGANIC PEROXIDE COMPOSITIONS
Hans Jaspers, Diepenveen, and Reinder Torenbeek, Twello, Netherlands, assignors to Koninklijke Industrieele Maalschappij Noury & Van der Lande N.V., Deventer, Netherlands
No Drawing. Filed Jan. 6, 1972, Ser. No. 215,947
Claims priority, application Netherlands, Jan. 14, 1971, 7100494
Int. Cl. C07c 73/00
U.S. Cl. 252—426      2 Claims

ABSTRACT OF THE DISCLOSURE

Chemically stable, non-separating compositions are disclosed comprising an organic peroxide which is solid at room temperature, or a mixture of such peroxides, a liquid phlegmatiser in which the peroxide or peroxide mixture does not dissolve or hardly dissolves, a hydrophobic alkyl group-containing silica compound, and, if desired, water, pigments, dyes and/or other additives.

---

The present invention relates to a process for preparing compositions containing organic peroxides, which are solid at room temperature, and liquid phlegmatisers, which compositions on storage are chemically stable, do not separate into their components, and which are capable of use as radical-generating compounds in reactions initiated by radicals, such as the copolymerization of unsaturated polyester resins which are mixtures of unsaturated polyesters and monomers copolymerizable therewith. The invention also relates to the compositions per se.

Organic peroxides which are solid at room temperature, such as dibenzoyl peroxide and ring-substituted derivatives thereof, such as bis(o-methylbenzoyl)peroxide,
bis-(o-methoxybenzoyl)peroxide,
bis(o-ethoxybenzoyl)peroxide,
bis-(o-chlorobenzoyl)peroxide,
bis(p-chlorobenzoyl)peroxide and
2,4-dichlorobenzoyl peroxide, aliphatic diacyl peroxides, such as didecanoyl peroxide and dilauroyl peroxide, peroxydicarbonates such as cetylperoxydicarbonate,
bis(4-tert.amylcyclohexyl)peroxydicarbonate,
bis(4-tert.butylcyclohexyl)peroxydicarbonate,
dicyclohexyl peroxydicarbonate and
dibenzylperoxydicarbonate, and other solid peroxides, such as cyclohexanone peroxide, are marketed in phlegmatised form in order to provide safe handling and/or better processing.

Phlegmatisers which may be used include phthalate plasticizers, such as dimethyl, dibutyl, dioctyl, butylbenzyl and polyglycol phthalate, and other plasticizers such as triethyl phosphate, tricresyl phosphate, acetyltributyl citrate, dioctyl adipate, epoxidized soya bean oil and glycols.

Some of these phlegmatisers have the property that organic peroxides which are solid at room temperature are easily soluble in them. It now appears that a composition containing an organic peroxide which is solid at room temperature and a phlegmatiser in which this peroxide is entirely or almost entirely soluble is not chemically stable, and this is manifested by a decrease in the active oxygen content of the composition.

Certain liquid phlegmatisers are known in which organic peroxides, which are solid at room temperature, do not or hardly dissolve. However, compositions containing these components have the disadvantage that they undergo separation, which takes the form of settling or floating of one or more of the components.

It has now been found in accordance with the present invention that, by incorporating a hydrophobic silica compound containing alkyl groups into a composition containing an organic peroxide, which is solid at room temperature, and a liquid phlegmatiser in which this peroxide or peroxide mixture does not dissolve or hardly dissolves, a very useful composition is obtained which does not separate and which retains an almost constant active oxygen content.

The hydrophobic silica containing methyl groups which is marketed under the trade name Aerosil R972 appears to be especially suitable for incorporation into compositions according to the present invention. Its characteristic data are:

Average particle size _____ 20 m$\mu$.
Surface according to BET _____ 120±30 m.$^2$/g.
Composition _____ 99.8% $SiO_2$+(—$CH_3$).
Carbon _____ 1.1±2%.
pH value (4% dispersion in
  methanol/water 1:1) _____ 3.8±2.
Apparent density _____ About 30–50 g./l.

This product is a hydrophobic lower alkyl substituted silica which is the reaction product of a pyrogenic silica with a lower dialkyl dichlorosilane and can be obtained in accordance with the methods described in German Auslegeschrift 1,163,784.

The quantity of hydrophobic alkyl group-containing silica to be incorporated in the composition is dependent upon the solid organic peroxides, liquid phlegmatizers and other additives, such as pigments, dyes and water, to be likewise incorporated in the composition. However, it has been found that depending upon the quantity used, the composition attains particular rheological properties. For instance, chemically stable, non-separating compositions which are non-pourable and others which are pourable may be obtained. In addition, these latter pourable compositions according to the present invention have the advantage that they are easy to measure into and quick to disperse homogeneously in polyester resins, for instance. Moreover, they can be readily pumped, which is also advantageous in continuous processing.

The compositions according to the present invention may be obtained by mixing the solid peroxide, the liquid phlegmatiser, the hydrophobic alkyl group containing silica and other additives in the quantities desired, for instance, in a Nauta mixer or another suitable mixer.

In principle, any organic peroxide which is solid at room temperature may be incorporated in a composition according to this invention. However, benzoyl peroxide, bis(o-methylbenzoyl) peroxide, bis(4-tert.butylcyclohyxyl)peroxydicarbonate, dilauroyl peroxide, cyclohexanone peroxide and mixtures of these peroxides in all ratios are the preferred peroxides.

Liquid phlegmatisers which may be used include glycols, for example, ethylene glycol, diethylene glycol, triethylene glycol and polyethylene glycols having different molecular weights, propylene glycol, dipropylene glycol, tripropyene glycol and polypropylene glycol, 1,3-propanediol, 1,4-butane-diol, 2,3-butane-diol, hexylene glycol, 1,5-pentane-diol, glycerol, the monoethers and diethers and esters of glycols, alcohols such as octanol, nonanol, decanol, dodecyl alcohol and mixtures of such non-volatile alcohols as are readily available on the market under various trade names. Further, paraffins and chloroparaffins with various chlorine contents may be used.

However, it is necessary that the peroxide concerned does not dissolve or, at most, dissolves only slightly, in the phlegmatiser.

In addition to liquid phlegmatisers, mixtures of liquid and solid phlegmatisers may also be used, as well as mixtures with water or with the phthalate and other plasticizers mentioned before. However, the mixture per se must be liquid and must also have no or essentially no dissolving power in respect of the solid peroxide or peroxide mixture to be used in the composition.

As already observed, the quantity of hydrophobic alkyl group-containing silica may vary over wide limits. However, compositions containing 20–60% by weight of solid, organic peroxide, 0–20% by weight of water, 2–6% by weight of Aerosil R972 (or other silica compound containing alkyl groups) and 20–60% by weight of liquid phlegmatisers, appear to be the most suitable.

The following details of working examples further illustrate the invention. Where in these examples reference is made to pourability, this was determined as follows: 400 g. of the composition were put in a wide-necked 500 ml. bottle having a diameter of 65 mm. and an outlet opening having a diameter of 55 mm. After filling, the bottle was placed in an inverted position at an angle of 70° with respect to the horizontal. After 1 minute, the quantity of composition which had flowed out was weighed. The composition was considered pourable, if $$\frac{\text{Weight of quantity flowing out}}{\text{Filler weight}} \times 100\% = 75\%$$

By Aerosil R972, the hydrophobic methyl group-containing silica having the characteristic data given above is meant.

EXAMPLE I 400 g. of bis(o-methylbenzoyl)peroxide, 200 g. of propylene glycol, 266 g. of polyglycol phthalate, 100 g. of water, 4 g. of zinc oxide and 30 g. of Aerosil R972 were mixed in a conical screw mixer at room temperature and subsequently further homogenized on a three-roller mill. A pourable composition was obtained which, after storage for 8 weeks at room temperature, was still chemically stable and non-separated.

EXAMPLE II

In an analogous way to that described in Example I, 500 g. of dibenzoyl peroxide, 100 g. of dibutyl phthalate, 100 g. of polyglycol phthalate, 165 g. of monobutyl ether of diethylene glycol, 100 g. of water, 5 g. of zinc oxide and 30 g. of Aerosil R972 were mixed. A pourable composition was obtained which, after storage for 8 weeks at room temperature, was still chemically stable and non-separated.

EXAMPLE III

In an analogous way to that described in Example I, 450 g. of dibenzoyl peroxide, 50 g. of bis(4-tert.butylcyclohexyl)peroxydicarbonate, 210 g. of polyethylene glycol with an average molecular weight of 200, 110 g. of polyglycol phthalate, 150 g. of water and 30 g. of Aerosil R972 were mixed. A pourable composition was obtained which, after storage for 8 weeks at room temperature, was unchanged.

EXAMPLE IV 400 g. of dilauroyl peroxide were mixed with 300 g. of polyethylene glycol having an average molecular weight of about 600, 170 g. of polyglycol phthalate, 100 g. of water and 30 g. of Aerosil R972 at room temperature. The mixture was homogenized on a three-roller mill. A paste was obtained which, after storage for 8 weeks at room temperature, was chemically stable and non-separated.

EXAMPLE V

With the aid of a high-speed dispersing apparatus, 400 g. of dilauroyl peroxide, 150 g. of decyl alcohol, 420 g. of polyethylene glycol having an average molecular weight of about 200, and 30 g. of Aerosil R972 were mixed intensively, the temperature rising to 40° C. A pourable composition was obtained which, after storage for 8 weeks at room temperature, was chemically stable and non-separated.

EXAMPLE VI 4000 g. of cyclohexanone peroxide, 4100 g. of polyethylene glycol having an average molecular weight of about 400, 1600 g. of water and 300 g. of Aerosil R972 were mixed in a planetary mixer and subsequently homogenized on a three-roller mill. A pourable composition was obtained which, after storage for 8 weeks at room temperature, was chemically stable and non-separated.

What is claimed is:

1. A chemically stable, non-separating composition consisting essentially of, in approximate parts by weight:
   (a) 20–60 parts of a free radical-generating organic peroxide, said peroxide being solid at room temperature;
   (b) up to 20 parts of water;
   (c) a hydrophobic lower alkyl substituted silica which is the reaction product of a pyrogenic silica with a lower dialkyl dichlorosilane in an amount sufficient to prevent the composition from physically separating into its components, the composition having at least 2 parts of the reaction product; and
   (d) the remainder being a liquid substance which is inert to the organic peroxide and in which the peroxide is substantially insoluble, said liquid substance being composed of one or more compounds selected from the group consisting of plasticizers and organic solvents.

2. The composition of claim 1 wherein said hydrophobic lower alkyl substituted silica is the reaction product of a pyrogenic silica with dimethyl dichlorosilane.

References Cited

UNITED STATES PATENTS

| | | | |
|---|---|---|---|
| 2,839,519 | 6/1958 | Seed | 252—426 X |
| 2,963,501 | 12/1960 | Plueddemann | 252—426 X |
| 3,029,206 | 4/1962 | Harrison et al. | 252—426 |
| 3,231,542 | 1/1966 | Eisinger et al. | 252—426 X |
| 3,436,371 | 4/1969 | Ware | 252—426 X |
| 3,181,991 | 5/1965 | Leveskis | 252—426 X |
| 3,182,026 | 5/1965 | Leveskis | 252—426 X |
| 3,290,257 | 12/1966 | Bader et al. | 252—426 |
| 3,520,825 | 7/1970 | Koehler et al. | 252—426 |

PATRICK P. GARVIN, Primary Examiner